(12) United States Patent
Wilcox

(10) Patent No.: US 7,646,283 B2
(45) Date of Patent: Jan. 12, 2010

(54) WIRELESS ACTIVATION SYSTEM, METHOD AND DEVICE

(75) Inventor: Martin S. Wilcox, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 591 days.

(21) Appl. No.: 10/536,246

(22) PCT Filed: Nov. 19, 2003

(86) PCT No.: PCT/IB03/05289

§ 371 (c)(1),
(2), (4) Date: May 24, 2005

(87) PCT Pub. No.: WO2004/051593

PCT Pub. Date: Jun. 17, 2004

(65) Prior Publication Data

US 2006/0164207 A1     Jul. 27, 2006

(30) Foreign Application Priority Data

Nov. 30, 2002 (GB) .................................. 0228032.9

(51) Int. Cl.
*H04B 1/38* (2006.01)

(52) U.S. Cl. .................. 340/5.61; 340/5.1; 340/5.2; 340/5.21; 340/5.24; 340/5.6; 340/5.8; 340/5.64

(58) Field of Classification Search ............... 340/5.61, 340/5.64, 10.1, 5.6, 825.22, 5.1, 5.2, 5.21, 340/5.8; 341/67, 51, 114
See application file for complete search history.

(56) References Cited

U.S. PATENT DOCUMENTS

| | | | | |
|---|---|---|---|---|
| 5,420,925 | A * | 5/1995 | Michaels | 380/262 |
| 6,208,239 | B1 * | 3/2001 | Muller et al. | 340/426.35 |
| 6,567,012 | B1 * | 5/2003 | Matsubara et al. | 340/825.72 |
| 6,774,762 | B2 * | 8/2004 | Bates | 340/5.21 |
| 2003/0076298 | A1 * | 4/2003 | Rosenberg | 345/156 |

* cited by examiner

*Primary Examiner*—Vernal U Brown
(74) *Attorney, Agent, or Firm*—Larry Liberchuk

(57) ABSTRACT

A wireless activation system, such as a keyless car entry system, uses repeated code sequences for communication between a transmitter device and a receiver device. By varying the sequence duration in a synchronism at the transmitter device and receiver device, either by varying the number of symbols or chips in the sequence, or by varying the symbol or chip rate, it is made more difficult for an unauthorised party to detect the code sequences and relay the code sequences to achieve unauthorised activation at the receive device.

29 Claims, 3 Drawing Sheets

WIRELESS ACTIVATION SYSTEM, METHOD AND DEVICE

The invention relates to a wireless activation system, apparatus for use therein, and a method of wireless activation, which may be used, for example, for remote control applications such as wireless activation and deactivation of a lock on a vehicle door, or for tagging a person, animal or object.

Figure 1:
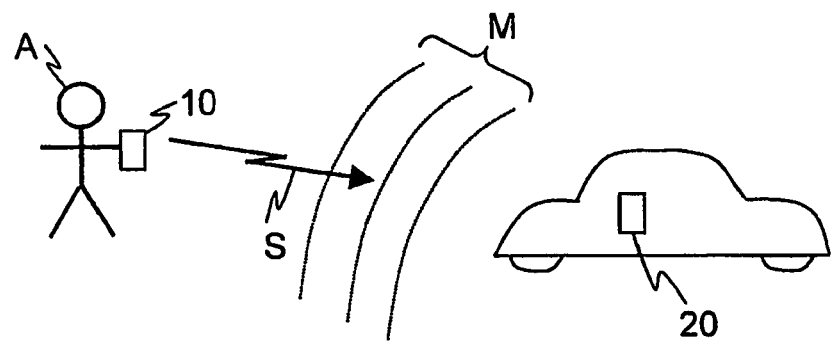

Keyless car entry systems, in which the proximity of the car owner with a key fob in his pocket is sufficient to unlock the car door, are becoming increasingly common-place. Such a system is illustrated in FIG. 1 and uses two-way communication between the key fob 10 held by the car owner A and an in-car device 20. Typically, the in-car device generates a magnetic field M using a 125 kHz signal so that it is limited to a range of a few metres. The key fob detects the magnetic field M and then responds with a UHF code signal S, for example in the range 800-900 MHz. When the in-car device is satisfied that a valid code signal S has been received from the key fob, the in-car device unlocks the car door. Alternatively, UHF or microwave frequency bands could be used for both the car to key fob communication and the key fob to car communication.

Keyless car entry systems can be extended to "Keyless Go" systems in which it is not even necessary to insert a key into an ignition switch in order to start the car's engine. Instead the driver presses a button and the car engine starts only if the key fob is nearby.

Figure 2:
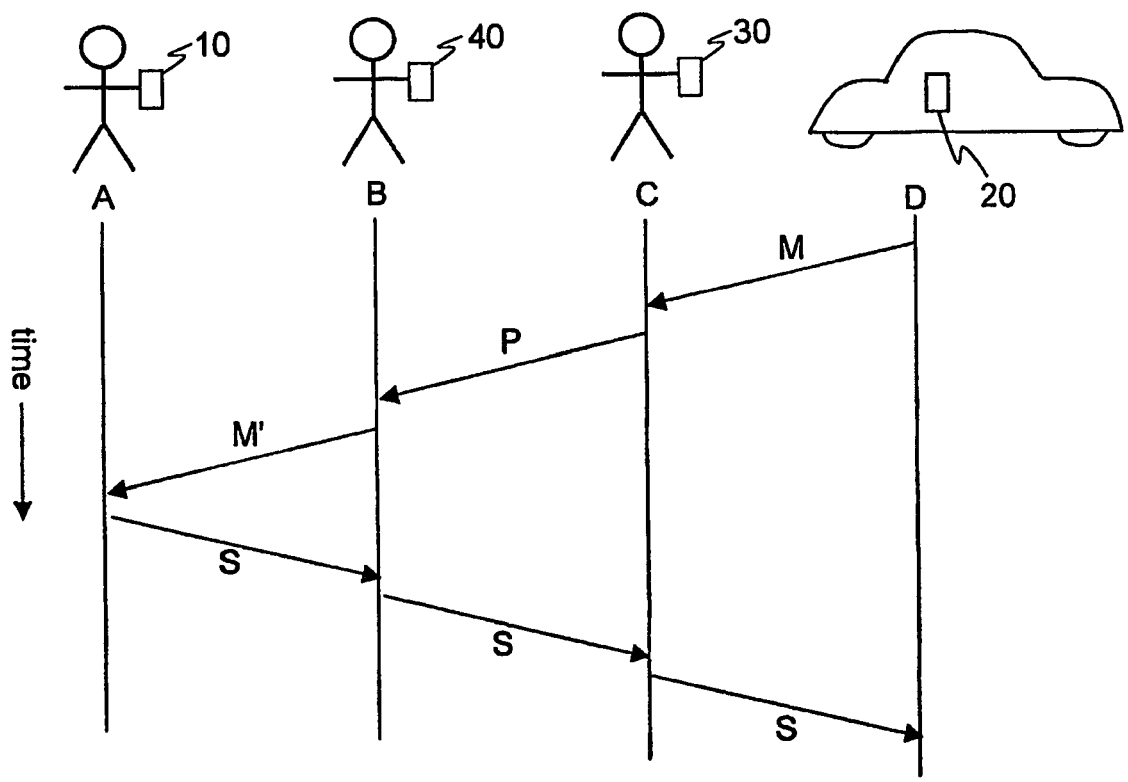

Known keyless car entry systems are susceptible to what is known as the "relay attack". Relay attack is illustrated in FIG. 2. A thief C close to the car uses first relay attack apparatus 30 to detect the magnetic field M around the car and to pass the parameters P of the magnetic field M to an accomplice B who is close to the owner A of the car. The accomplice B uses a second relay attack apparatus 40 to receive the parameters P of the magnetic field M and to generate a spurious magnetic field M' which mimics the magnetic field M generated by the in-car device 20. The owner's key fob 10 responds by transmitting the code signal S, even though the owner A may be many hundreds of metres away from the car. The second relay attack apparatus 40 relays the code signal S to the first relay attack apparatus 30, which in turn relays the code signal S to the in-car device 20. The in-car device 20 reacts to the code signal S by unlocking the car door, and the thief C is able to steal the car.

One method of mitigating against the relay attack is to measure the time of flight of the code signal S and to unlock the car door only if the time of flight measurement indicates that the key fob is very close to the car. However, practical schemes for measuring the time of flight result in an ambiguity such that, by inserting a delay in the code signal S relayed from the key fob to the in-car device, the key fob can be made to seem closer to the car than it actually is. Therefore even known protection systems are vulnerable to relay attack.

Tagging systems can also be vulnerable to relay attack. In such a system a person, animal or object is equipped with a transmitter device for transmitting a signal to a receiver device. The receiver device estimates the distance of the transmitter device and if the distance becomes larger than a predetermined value, or alternatively, depending on the application, smaller than a predetermined value, an alert is generated. By means of a relay attack, the receiver device can be deceived into making a false estimate of distance.

An object of the present invention is to make relay attack more difficult.

According to a first aspect of the invention there is provided a wireless activation system comprising a first device having means for generating and transmitting a code signal, wherein each successive transmission of the code signal comprises a successive code sequence from a succession of code sequences, and a second device having means for generating the succession of code sequences in synchronism with the first device, means for receiving the code signal, means for detecting the successive code sequence transmitted by the first device, means for generating an indication of the time of flight of the code signal, and means for generating an activation signal in response to the combination of the detected successive code sequence corresponding to the successive code sequence generated most recently by the second device and the indication of the time of flight being within a predetermined range of values, wherein the succession of code sequences comprises code sequences of different time durations.

According to a second aspect of the invention there is provided a method of wireless activation comprising at a first device generating and transmitting a code signal, wherein each successive transmission of the code signal comprises a successive code sequence from a succession of codes, and at a second device generating the succession of code sequences in synchronism with the first device, receiving the code signal, detecting the successive code sequence transmitted by the first device, generating an indication of the time of flight of the code signal, and generating an activation signal in response to the combination of the detected successive code sequence corresponding to the successive code sequence generated most recently by the second device and the indication of the time of flight being within a predetermined range of values, wherein the succession of code sequences comprises code sequences of different time durations.

According to a third aspect of the invention there is provided a transmitter device for use in a wireless activation system, comprising means for generating and transmitting a code signal wherein each successive transmission of the code signal comprises a successive code sequence from a succession of code sequences and wherein the succession of code sequences comprises code sequences of different time durations. The term "transmitter device" does not exclude the possibility of the device also including a receiver, but is merely used for convenience to denote a device that suitable for generating and transmitting the code signal.

According to a fourth aspect of the invention there is provided a receiver device for use in a wireless activation system, comprising means for generating a succession of code sequences, means for receiving a code signal, means for detecting a code sequence conveyed by the code signal, means for generating an indication of the time of flight of the code signal, and means for generating an activation signal in response to the combination of the detected code sequence corresponding to the code sequence generated most recently and the indication of the time of flight being within a predetermined range of values, wherein the succession of code sequences comprises code sequences having different time durations. The term "receiver device" does not exclude the possibility of the device also including a transmitter, but is merely used for convenience to denote a device that is suitable for receiving the code signal and, in response, generating the activation signal.

Each code signal comprises a number of identical code sequences. By using code sequences of different durations in different code signals, it becomes more difficult for relay attack apparatus to predict the duration of a transmitted code sequence, the code sequence is more difficult for the relay attack apparatus to detect, and the delay required to deceive the receiver device into being activated by a distant transmitter device is more difficult for the relay attack apparatus to calculate and insert in the relayed signal.

Code sequences of different durations may be implemented by using different numbers of symbols or chips in the code sequences, or by using different symbol or chip rates.

Figure 3:
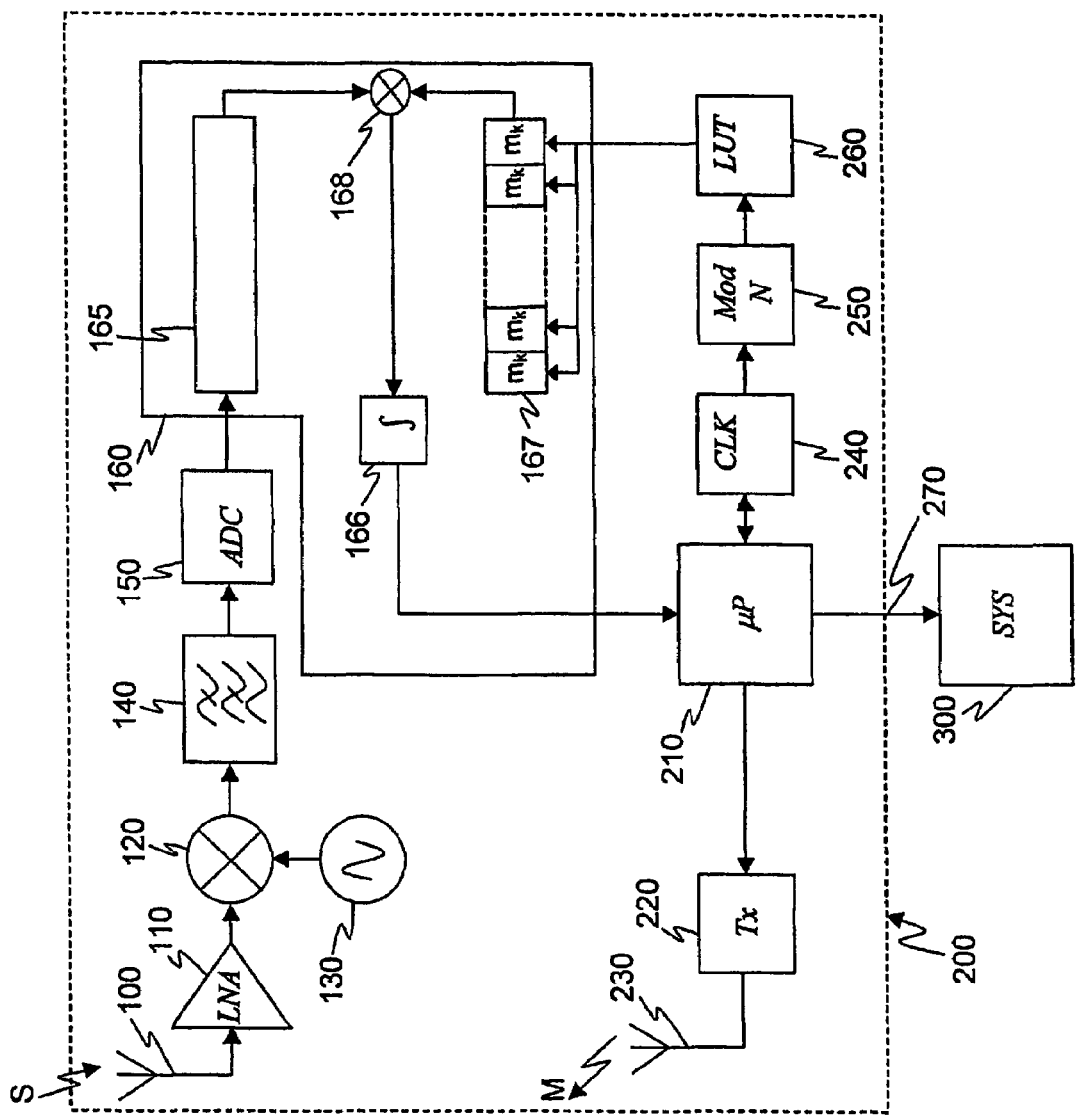
Figure 4:
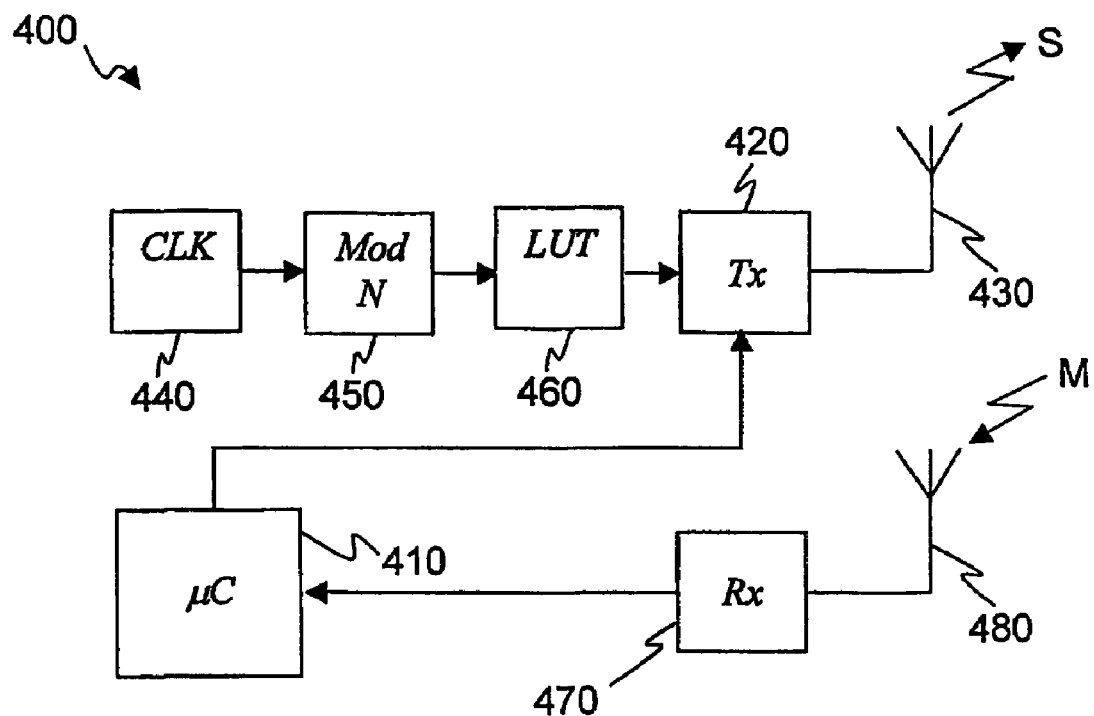
Figure 5:
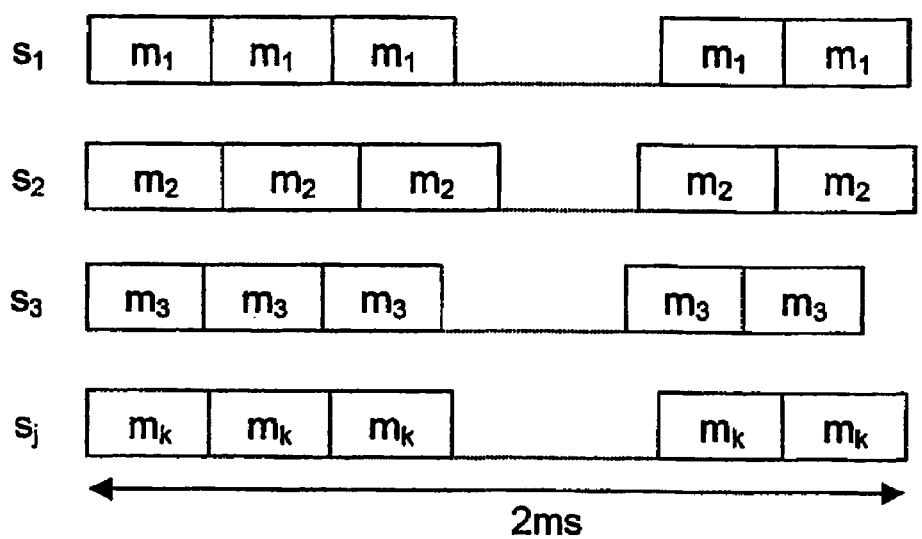

The invention will now be described, by way of example only of a keyless car entry system, with reference to the following drawings in which:

FIG. 1 is a schematic diagram of a wireless activation system,

FIG. 2 is a signal flow diagram of a wireless activation system under relay attack, FIG. 3 is a block schematic diagram of a receiver device in accordance with the present invention for use in a wireless activation system, FIG. 4 is a block schematic diagram of a transmitter device in accordance with the present invention for use in a wireless activation system, and FIG. 5 illustrates a succession of code signals.

First, an explanation is presented of how the ambiguity in the calculated time of flight arises. To illustrate this, we consider an example in which a code signal $s_j$, j=1, N is a direct sequence spread spectrum signal having a chip rate of 1 Mchip/s and in which the transmit power of the transmitter device is −20 dBm in order to ensure a long battery life. In order to enable the receiver device to be simple, rather than transmit a single, long code sequence, each code signal $s_j$ comprises a short code sequence $m_k$, k=1, P repeated identically within the code signal $s_j$. For example, code signal $s_1$ can have a length of 10 chips corresponding to 10 μs duration. In order to ensure reliable detection of the code signal $s_j$, the receiver device enables its receiver for a time window when the code signal $s_j$ is expected to be received. In order to measure a distance of 10 m to an accuracy of 1 m using the power level of −20 dBm, the receiver device typically needs to receive a signal of 1 ms duration in order to average the noise sufficiently, so the duration of the receiver time window is chosen to be approximately 1 ms. The precise time of arrival of the code signal $s_j$ at the receiver device is uncertain due to the variable propagation distance of the code signal $s_j$, and to ensure that 1 ms of signal is received when the receiver is enabled throughout the time window, the transmitted code signal $s_j$ is longer than the time window, and comprises the code sequence $m_k$ repeated for an overall duration of 2 ms. The code signal $s_1$ with a constituent code sequence $m_1$ is illustrated in FIG. 5.

A receiver device 200 suitable for use in an in-car device and adapted in accordance with the invention is illustrated in FIG. 3. It comprises a transmitter (Tx) 220 coupled to an antenna 230 for radiating the magnetic field M and coupled to a processing means (μP) 210 such as a microprocessor for controlling generation of the magnetic field M. In addition there is a low noise amplifier (LNA) 110 for receiving the code signal $s_1$ from an antenna 100. An output of the LNA 110 is coupled to a first input of a mixer 120 where it is down converted by being mixed with a local oscillator signal generated by a local oscillator source 130 and coupled to a second input of the mixer 120. An output of the mixer is coupled to an input of a low pass filter 140 and an output of the low pass filter 140 is coupled to an input of an analogue-to-digital converter (ADC) 150. An output of the ADC 150 is coupled to an input of a detector 160 for detecting the code signal $s_j$. The detector 160 comprises a buffer 165 for storing the part of the received code signal $s_j$ received in the receiver time window and delivered from the output of the ADC 150. The detector 160 also comprises a cyclic register 167 for storing a reference code signal comprising identical concatenated code sequences $m_k$. An output from the buffer 165 and an output from the cyclic register 167 are coupled to respective inputs of a multiplier 168, an output of the multiplier 168 is coupled to an input of an integrator 166, and an output of the integrator 166 is coupled to an input of the processing means 210. In operation, correlation between the signal stored in the buffer 165 and the reference code signal stored in the cyclic register 167 is performed by multiplying these signals in the multiplier 168 and integrating the resulting product in the integrator 166, and repeating these steps for consecutive cyclic shifts of the reference code signal in the cyclic register 167. Due to the use of short code sequences $m_k$, a correlation peak occurs at the output of the integrator 166 within at most the number of cyclic shifts corresponding to the length of the code sequence $m_k$. The processing means 210 processes the correlation signal supplied to it by integrator 166 to identify the time of occurrence of the correlation peak and to estimate the time of flight of the code signal $s_j$. To enable the time of flight to be calculated the processing means 210 is coupled to a clock (CLK) 240. Signals detected by the detector 160 are used by the processing means 210 to adjust the clock 240 so that it is maintained in synchronism with the device transmitting the code signal (i.e. transmitter device 400 having a clock 440, described below in relation to FIG. 4). From the time of flight the processing means 210 calculates the distance of the receiver device 200 from the key fob and if the distance is within a predetermined limit, generates an activation signal on an output 270 which is coupled to a car locking system (SYS) 300. The activation signal results in the car doors being unlocked.

Because the code signal $s_j$ comprises identical concatenated code sequences $m_k$, a similar correlation peak is observed at the output of the detector 160 if the code signal $s_j$ is delayed by a multiple of the code sequence $m_k$ duration, so there is an ambiguity in the calculated time of flight of the code signal $s_j$. In the case of code sequence $m_1$ of duration 10 μs, there is an ambiguity of n×10 μs, where n is an integer. This results in an ambiguity of n×3 km in the calculated propagation distance.

The ambiguity can be resolved by ensuring that the ambiguity is larger than any distance required to be measured and by subtracting units of the ambiguity distance away from the measured distance until a figure less than the ambiguity distance is obtained. For example, for a keyless car entry system, only distances up to about 20 m need to be measured as the system does not need to operate over longer distances. If the key fob is further away than 3 km, insufficient signal power will propagate to the vehicle to enable a distance measurement to be made. If the measurement using the code sequence $m_1$ yields a propagation distance of 3.01 km, it can be readily concluded by subtracting the ambiguity distance of n×3 km that the key fob is 10 m from the vehicle. However, under relay attack, the key fob may in reality be 3.01 km from the vehicle with the power level of the code signal boosted by the relay attack apparatus 30.

As another example, the key fob may be 1 km from the vehicle, at which distance the receiver device 200 should determine that it should not react to the code signal $s_1$ because the driver is too distant. However, a relay attack apparatus 30 or 40 could insert an additional delay of 6.7 μs causing the receive device 200 to measure a distance of 3.01 km and conclude, after allowing for ambiguity of n×3 km, that the key fob is only 10 m from the vehicle, and therefore falsely allow access to the vehicle.

According to the invention, protection against relay attack is provided by arranging for the duration of the code sequence to vary. There is a predetermined set of code signals $s_j$, j=1,N, where each code signal $s_j$ comprises a predetermined code sequence from the set of code sequences $m_k$, k=1,P. The code sequences $m_k$ are chosen to have a low cross correlation. The number of different durations of the code sequences $m_k$, and the number of different values P of the code sequences $m_k$, may be less than N, i.e. the code sequences $m_k$ need not be unique within the predetermined set of code signals $s_j$. The code signals $s_j$ may be unique to a particular pair of transmitter device and receiver device, or the order in which the code signals $s_j$ are transmitted may be unique to a particular pair of transmitter device and receiver device.

In the example embodiment, having transmitted a code signal $s_1$ comprising a code sequence $m_1$ of length 10 chips, the next code signal transmitted will be $s_2$ and will comprise a code sequence $m_2$ of length 11 chips. By using code sequence $m_2$ the time ambiguity increases to 11 μs and the distance ambiguity increases by 300 m to n×3.3 km. Now if the key fob is 1 km from the vehicle and a relay attack apparatus 30 or 40 inserts an additional delay of 6.7 μs, the receive device 200 will measure a distance of 3.01 km and conclude, after allowing for ambiguity, that the key fob is 3.01 km from the vehicle, and therefore not allow access to the vehicle.

The next code signal to be transmitted will be $s_3$ and will comprise a code sequence $m_3$ of length 9 chips. By using code sequence $m_3$ the time ambiguity decreases to 9 μs and the distance ambiguity decreases by 300 m to n×2.7 km. Now if the key fob is 1 km from the vehicle and a relay attack apparatus 30 or 40 inserts an additional delay of 6.7 μs, the receive device 200 will measure a distance of 3.01 km and conclude, after allowing for ambiguity, that the key fob is 310 m from the vehicle, and therefore not allow access to the vehicle. In this case, if the relay attack apparatus 30 or 40 is to succeed in deceiving the receive device 200 into concluding that the key fob was only 10 m away, the relay attack apparatus 30 or 40 would need to insert an additional delay of 5.7 μs. By varying the duration of the code sequences $m_k$, it becomes more difficult for the relay attack apparatus 30 or 40 to detect the code signal $s_j$ and more difficult to estimate and implement the delay required to deceive the receiver device 200. In FIG. 5, the code signals $s_1$, $s_2$ and $s_3$ are illustrated, together with a generalised code signal $s_j$ comprising code sequences $m_k$.

Referring to FIG. 4, there is shown a block schematic diagram of a transmitter device 400 in accordance with the invention and suitable for use in a key fob. It comprises receiver (Rx) 470 coupled to a receive antenna 480 for detecting the magnetic field M emitted by the in-car device. An output of the receiver 470 is coupled to an input of a control means (μC) 410, and an output of the control means 410 is coupled to an input of a transmitter (Tx) 420. On detection of the magnetic field M, the control means 410 initiates transmission of the code signal $s_j$ by the transmitter 420 which is coupled to a transmit antenna 430. The code sequences $m_k$ for transmission in the code signals $s_j$ are supplied to the transmitter 420 from a look-up table (LUT) 460. The selection of code sequence from the LUT 460 for transmission is made by a modulo N counter 450 which is coupled to address the LUT 460. The modulo N counter 450 is clocked by a clock (CLK) 440 and counts 0 to N−1 cyclically. The duration of each code signal $s_j$ is dependent on the duration of the code sequences $m_k$, and on the number of code sequences transmitted in each code signal $s_j$, which may be varied by the control means 410.

Referring again to FIG. 3, in the receiving device 200 reference code sequences, identical to the code sequences $m_k$ stored in the LUT 460 of the transmitter device 200, are stored in a look-up table (LUT) 260 which is coupled to the detector 160, and reference code sequences are supplied to the cyclic register 167 thereby forming the reference code signal.

The constituent elements of the detector 160 are adaptive to detect code sequences $m_k$ of different durations, and the processing means 210 is adaptive to determine the time of flight for code sequences $m_k$ of different durations.

The selection of reference code sequence from the LUT 260 for correlation is made by a modulo N counter 250 which is coupled to address the LUT 260. The modulo N counter 550 is clocked by the clock (CLK) 240 and counts 0 to N−1 cyclically. The clock 240 is coupled to the processing means 210 and can be adjusted in response to the detection of the received code sequences $m_k$ in order to synchronise the clock 240 with the corresponding clock 440 in the transmitting device 400. In this way, the choice of which code sequence $m_k$ is transmitted and received is dependent respectively on the current value of the counter 450 of the transmitter device 400 and the counter 250 of the receiver device 200, and the decoder 160 is maintained in synchronism to correlate for the code sequence transmitted by the transmitter device 400.

Provision may be made in case the counters 450, 250 in the transmitter device 400 and receiver device 200 become non-synchronised, for example due to an extended period without communication. One way of coping with this situation is for the receiving device 200 to correlate for a range of code sequences, instead of for a single code sequence $m_k$, the range of code sequences corresponding to the degree of non-synchronism likely. In this way, it can be ensured that the receiving device 200 will react to the code sequence mostly recently transmitted by the transmitter device 400, even though the receiving device 200 may have a margin of uncertainty over which code sequence is a prori being transmitted.

Other methods of selecting the code sequence $m_k$ may be used. For example, the next code sequence $m_k$ in a predetermined succession of code sequences may be selected for each successive transmission of the code signal $s_j$. If this method is used, the transmitter device 400 and receiver device 200 can become non-synchronised if the transmitter device 400 transmits a code signal $s_j$ that the receiving device 200 fails to receive, perhaps because of inadequate signal strength. To cope with this situation, the receiving device 200 may correlate for a range of code sequences, instead of for a single code sequence $m_k$, the range of code sequences corresponding to the degree of non-synchronism likely.

It is not essential for the duration of the code sequence in every successive code signal $s_j$ to vary from the duration of the code sequence in the previously transmitted code signal, provided that the duration changes sufficiently frequently to make unauthorised detection difficult. For example, the duration of the code sequence may be changed after transmission of a predetermined number of code signals or after the elapse of a predetermined time period, the change being controlled in the transmitter device 400 by either the clock 440 or the control means 410, and in the receiving device by either the clock 240 or the processing means 210.

As a result of varying the duration of the code sequences, the duration of the code signal may vary proportionally. The number of repetitions of the code sequence within the code signal may be varied by the control means 410 to maintain an approximately constant duration of the code signal.

Similarly, the duration of the receiver time window may be varied proportionally with the varying duration of the code sequences, or alternatively the length of the buffer 165 and the cyclic register 167 may be adaptive to detect an approximately constant duration of code signal.

Although an embodiment has been described using direct sequence spread spectrum sequences, alternatively the code sequences may comprise frequency hopping sequences.

The invention is not limited to keyless car entry systems and to systems for tagging a person, animal or object, but may be used in other applications requiring wireless activation dependent on time of flight or propagation distance measurement.

In the present specification and claims the word "a" or "an" preceding an element does not exclude the presence of a plurality of such elements. Further, the word "comprising" does not exclude the presence of other elements or steps than those listed.

The invention claimed is:

1. A wireless activation system comprising:
   a first device that is configured to generate and transmit a code signal, wherein each successive transmission of the code signal includes a successive code sequence from a succession of code sequences, and
   a second device that is configured to:
      generate the succession of code sequences in synchronism with the first device,
      receive the code signal,
      detect the successive code sequence transmitted by the first device,
      generate an indication of a time of flight of the code signal, and
      generate an activation signal in response to the combination of the detected successive code sequence corresponding to the successive code sequence generated most recently by the second device and the indication of the time of flight being within a predetermined range of values,
   wherein the succession of code sequences includes code sequences of different time durations, and wherein the successive code sequence includes a concatenation of the code sequence with itself a plurality of times.

2. The wireless activation system of claim 1, wherein the code sequences of different time durations include code sequences of different symbol or chip durations.

3. The wireless activation system of claim 1, wherein the code sequences of different time durations include code sequences of different numbers of symbols or chips.

4. The wireless activation system of claim 1, wherein the first device is configured to change the time duration of the transmitted successive code sequence in response to the elapse of a predetermined time period.

5. The wireless activation system of claim 1, wherein the first device is configured to change the time duration of the transmitted successive code sequence in response to the transmission of a predetermined number of the code signals.

6. The wireless activation system of claim 1, wherein the second device is configured to generate the activation signal in response to the indication of the time of flight being below a predetermined limit.

7. The wireless activation system of claim 6, wherein the second device is configured to activate or deactivate a lock in response to the activation signal.

8. The wireless activation system of claim 7, wherein the second device includes the lock.

9. The wireless activation system of claim 7, wherein the wireless activation system is a vehicle security system.

10. The wireless activation system of claim 1, wherein the second device is configured to generate the activation signal in response to the indication of the time of flight being above a predetermined limit.

11. The wireless activation system of claim 10, wherein the second device is configured to generate an alert in response to the activation signal.

12. The wireless activation system of claim 11, wherein the wireless activation system is a system for tagging a person, animal or object.

13. The wireless activation system of claim 1, wherein each code sequence includes a spread spectrum sequence.

14. The wireless activation system of claim 13, wherein the spread spectrum sequence is a frequency hopping sequence.

15. A method of wireless activation comprising:
   at a first device, generating and transmitting a code signal, wherein each successive transmission of the code signal includes a successive code sequence from a succession of codes, and
   at a second device:
      generating the succession of code sequences in synchronism with the first device,
      receiving the code signal,
      detecting the successive code sequence transmitted by the first device,
      generating an indication of a time of flight of the code signal, and
      generating an activation signal in response to the combination of the detected successive code sequence corresponding to the successive code sequence generated most recently by the second device and the indication of the time of flight being within a predetermined range of values,
   wherein the succession of code sequences includes code sequences of different time durations, and wherein the successive code sequence includes a concatenation of the code sequence with itself a plurality of times.

16. The method of wireless activation of claim 15, wherein the code sequences of different time durations include code sequences of different symbol or chip durations.

17. The method of wireless activation of claim 15, wherein the code sequences of different time durations include code sequences of different numbers of symbols or chips.

18. The method of wireless activation of claim 15 wherein the time duration of the transmitted code sequence is changed in response to the elapse of a predetermined time period.

19. The method of wireless activation of claim 15 wherein the time duration of the transmitted code sequence is changed in response to the transmission of a predetermined number of the code signals.

20. A transmitter device for use in a wireless activation system, comprising:
   a code generator that is configured to generate a code signal,
   a transmitter that is configured to transmit the code signal,
   wherein each successive transmission of the code signal includes a successive code sequence from a succession of code sequences and wherein the succession of code sequences includes code sequences of different time durations, and wherein the successive code sequence includes a concatenation of the code sequence with itself a plurality of times.

21. The transmitter device of claim 20, wherein the code sequences having different time durations include code sequences having different symbol or chip durations.

22. The transmitter device of claim 20, wherein the code sequences having different time durations include code sequences having different numbers of symbols or chips.

23. A receiver device for use in a wireless activation system, comprising:

a generator that is configured to generate a succession of code sequences, a receiver that is configured to receive a code signal, a detector that is configured to detect a code sequence conveyed by the code signal, an other generator that is configured to generate an indication of a time of flight of the code signal, and a further generator that is configured to generate an activation signal in response to the combination of the detected code sequence corresponding to the code sequence generated most recently and the indication of the time of flight being within a predetermined range of values, wherein the succession of code sequences includes code sequences having different time durations, and wherein the successive code sequence includes a concatenation of the code sequence with itself a plurality of times.

24. The receiver device of claim 23, wherein the code sequences having different time durations include code sequences having different symbol or chip durations.

25. The receiver device of claim 23, wherein the code sequences having different time durations include code sequences having different numbers of symbols or chips.

26. The receiver device of claim 23, including means to change the time duration of the generated code sequences in response to the elapse of a predetermined time period.

27. The receiver device of claim 23, including means to change the time duration of the generated code sequences in response to the generation of a predetermined number of the successive code sequences.

28. The receiver device of claim 23, wherein the further generator generates the activation signal in response to the indication of the time of flight being below a predetermined limit.

29. The receiver device of claim 23, wherein the further generator generates the activation signal in response to the indication of the time of flight being above a predetermined limit.

* * * * *